(12) United States Patent
Turnquist et al.

(10) Patent No.: US 12,719,894 B2
(45) Date of Patent: Aug. 25, 2026

(54) METHOD FOR NETWORK TRAFFIC ANALYSIS

(71) Applicant: Boon Logic Inc., Minneapolis, MN (US)

(72) Inventors: Brian Turnquist, Arden Hills, MN (US); Luke Arend, Minneapolis, MN (US)

(73) Assignee: Boon Logic Inc., Minneapolis, MN (US)

( * ) Notice: Subject to any disclaimer, the term of this patent is extended or adjusted under 35 U.S.C. 154(b) by 0 days.

(21) Appl. No.: 17/787,765

(22) PCT Filed: Dec. 22, 2020

(86) PCT No.: PCT/US2020/066586
§ 371 (c)(1),
(2) Date: Jun. 21, 2022

(87) PCT Pub. No.: WO2021/133791
PCT Pub. Date: Jul. 1, 2021

(65) Prior Publication Data

US 2023/0344846 A1 Oct. 26, 2023

Related U.S. Application Data

(60) Provisional application No. 62/953,018, filed on Dec. 23, 2019.

(51) Int. Cl.
*H04L 9/40* (2022.01)

(52) U.S. Cl.
CPC ................................ *H04L 63/1425* (2013.01)

(58) Field of Classification Search
CPC .................................................. H04L 63/1425
See application file for complete search history.

(56) References Cited

U.S. PATENT DOCUMENTS 8,869,276 B2 * 10/2014 Crovella ............. H04L 63/1425 713/168
9,483,742 B1 11/2016 Ahmed
(Continued)

FOREIGN PATENT DOCUMENTS

WO 2016146609 9/2016

OTHER PUBLICATIONS

Qader, Karwan et al. "DOS and Brute Force Attacks Faults Detection Using an Optimised Fuzzy C-Means", 2019 IEEE International Symposium on Innovations in Intelligent Systems and Applications (INISTA), IEEE, Jul. 3, 2019, pp. 1-6.

(Continued)

*Primary Examiner* — Brian J. Gillis
*Assistant Examiner* — Juan C Turriate Gastulo
(74) *Attorney, Agent, or Firm* — Padda Law Group

(57) ABSTRACT

The present disclosure, in one embodiment, relates to a method for network traffic analysis. The method includes a step of reception of a data set associated with an internet traffic at a network traffic analyzing system with a processor. The method includes another step of segmentation of the internet traffic to create a plurality of clusters based on a pre-selected percent variation. The method includes yet another step of determination of a relative activity of a set of clusters at a point in time. The method includes yet another step of determination of the relative activity of the set of clusters during successive time intervals. The data set associated with the internet traffic comprising data in the form of packets, wherein each packet is vectorized into a sequence of n-values. Each cluster of the plurality of clusters containing similar packets assigned with a same cluster ID.

24 Claims, 9 Drawing Sheets

(56) References Cited

U.S. PATENT DOCUMENTS

| | | | | |
|---|---|---|---|---|
| 10,681,012 | B2 | 6/2020 | Subbarayan et al. | |
| 10,708,122 | B1 * | 7/2020 | Liu | H04L 41/5009 |
| 2015/0120856 | A1 * | 4/2015 | Bennett | H04L 41/14 709/213 |
| 2017/0093675 | A1 * | 3/2017 | Chuang | H04L 43/18 |
| 2018/0341394 | A1 * | 11/2018 | Sangli | G06T 11/206 |
| 2019/0180141 | A1 * | 6/2019 | Tiagi | G06N 20/00 |
| 2019/0294598 | A1 * | 9/2019 | Hsiao | G06F 16/22 |
| 2020/0036684 | A1 * | 1/2020 | Thompson | H04L 63/1416 |
| 2020/0112574 | A1 * | 4/2020 | Koral | G06F 16/245 |
| 2020/0382329 | A1 * | 12/2020 | Yuan | G06F 13/28 |
| 2021/0029003 | A1 * | 1/2021 | Morman | H04L 41/0631 |
| 2022/0346108 | A1 * | 10/2022 | Eleftheriadis | H04W 28/0226 |

OTHER PUBLICATIONS

Kumar, Nandan et al. "A Comparative Study of Machine Learning Methods for Generation of Digital Forensic Validated Data", 2017 Ninth International Conference on Advanced Computing (ICOAC), IEEE, Dec. 14, 2017, pp. 15-20.

International Search Report and Written Opinion for priority PCT Application PCT/US2020/066586 mailed Mar. 1, 2021 (15 pages).

* cited by examiner

500

METHOD FOR NETWORK TRAFFIC ANALYSIS

CROSS REFERENCE TO RELATED APPLICATION

The application claims priority to U.S. Provisional Patent Application having Ser. No. 62/953,018 which is hereby incorporated herein in its entirety.

FIELD OF THE INVENTION

The present disclosure relates to a method for network traffic analysis, in particular, relates to an unsupervised machine learning method to measure and visualize network traffic at endpoints, subnets, borders and data centers.

BACKGROUND OF THE INVENTION

Nowadays, various computing devices are accessible over public communication networks, such as an Internet. However, the internet also presents substantial risks to the organizations. In an example, malicious activity such as distributed denial-of-service attacks is a common way of utilizing distributed computing resources, often under unauthorized control, to overload the capacity of organizations' systems. The conventional solution relating to network security implements traffic analysis based on information corresponding to lower level network layers within the subnet (or MAC) stack, internet (or IP) stack and transport (or TCP/UDP) stack. Conventionally, some servers and network routers include security software or applications configured to protect a network from various forms of attack. Such network security applications use a variety of methods to identify malware or an attack on the network, and take measures to protect the network when an attack is detected. For many organizations, such as organizations utilizing the Internet to interact with and/or otherwise service customers, preventing servers from responding to legitimate requests can cause significant harm to costs, revenue, customer goodwill, and in other ways. Not only is a DDoS victim prevented from servicing customers, but it may also be responsible for costs to Internet service providers (ISPs) for the increased network traffic attributable to DDoS attacks. However, the present invention allows a production of an unsupervised segmentation of packets associated with the internet traffic grouping similar packets together and creating a dimensionally coherent reduction of the millions or billions of packets in the data set. In some embodiments, the present solution utilizes unsupervised technologies that autonomously learn their environment and create millions of inferences in seconds to capture anomalous activity and behavior, identify degrees of similarity and dimensionality within unstructured data, and predict likely future outcomes orders of magnitudes faster than competitive solutions.

U.S. patent application Ser. No. 14/524,376 discloses techniques comprise identifying and/or classifying malicious activity in a web services platform using machine learning techniques. Systems, methods, and computer readable mediums may cause one or more computing nodes to monitor first network traffic, generate network information based on the monitored first network traffic, train a machine learning algorithm based on at least a first portion of the generated network information, test the machine learning algorithm based on at least a second portion of the generated network information, generate a predictor using the trained and tested machine learning algorithm, and identify second network traffic as one or more of malicious activity and benign activity using the predictor.

U.S. patent application Ser. No. 15/793,671, relates to the field of networking and API/application security. In particular, the application is directed towards methods, systems and computer program products for deep learning-based API traffic analysis and network security. The application discloses an automated approach to threat and/or attack detection by machine learning based accumulation and/or interpretation of various API/application traffic patterns, identifying and mapping characteristics of normal traffic for each API, and thereafter identifying any deviations from the normal traffic parameter baselines, which deviations may be classified as anomalies or attacks.

Thus, there continues to be a need for a new and improved method for analyzing network traffic

BRIEF SUMMARY OF THE INVENTION

The present disclosure, in one embodiment, relates to a method for network traffic analysis. The method includes receiving a data set associated with internet traffic at a network traffic analyzing system that includes a processor; segmenting of the internet traffic to create a plurality of clusters based on a pre-selected percent variation; determining a relative activity of a set of clusters at a point in time; and further determining the relative activity of the set of clusters during successive time intervals. The data set associated with the internet traffic comprising data in the form of packets, wherein each packet is vectorized into a sequence of n-values. Each cluster of the plurality of clusters containing similar packets assigned with a same cluster ID.

In an embodiment of the present disclosure, the network traffic analyzing system includes a tool. In addition, the tool includes a memory and a CPU for processing code having efficient segmentation capability.

In an embodiment of the present disclosure, the tool determines the optimal number of clusters based on the desired percent variation using the elbow technique In an embodiment of the present disclosure, the segmentation of the internet traffic is performed using a K-means algorithm.

In an embodiment of the present disclosure, the relative activity of the set of clusters is determined using a neuronal model of internet traffic activity. In addition, the neuronal model facilitates replacement of each packet event with an exponentially decaying action potential event forming a continuous activation plot for a specific network-connected device allotted with a specific cluster ID.

In an embodiment of the present disclosure, the network traffic analyzing system provides continuous activation plots and discrete activation plots calculated in real-time across all the set of clusters.

In an embodiment of the present disclosure, the discrete activation plots facilitate creation of a heat map for a network-connected device showing relative activity of clusters during successive time intervals. In addition, the activation plots and associated heat maps create characterization of device-level network traffic which may be compared universally across all devices on all networks.

In an embodiment of the present disclosure, the network traffic analyzing system provides multi-dimensional view of all activities of network connected devices by correlating activation plots across both time and cluster ID on a subnet.

In an embodiment of the present disclosure, the network traffic analyzing system projects a Sentry View of network traffic around three independent axes, such as time, machine (MAC address or IP address), and packet species (cluster ID).

In an embodiment of the present disclosure, the Sentry View creates a universal taxonomy describing all network behavior, even across different organizations having diverse network topologies.

In another aspect, the present disclosure provides a computer system. The computer system includes one or more processors and a memory. The memory is coupled to the one or more processors. The memory is used to store instructions. The instructions in the memory when executed by the one or more processors cause the one or more processors to perform a method. The one or more processors perform the method for network traffic analysis. The method includes a step of reception of a data set associated with an internet traffic at a network traffic analyzing system with a processor. The method includes another step of segmentation of the internet traffic to create a plurality of clusters based on a pre-selected percent variation. The method includes yet another step of determination of a relative activity of a set of clusters at a point in time. The method includes yet another step of determination of the relative activity of the set of clusters during successive time intervals. The data set associated with the internet traffic comprising data in the form of packets, wherein each packet is vectorized into a sequence of n-values. Each cluster of the plurality of clusters containing similar packets assigned with a same cluster ID.

In yet another aspect, the present disclosure provides a computer-readable storage medium. The computer readable storage medium enables encoding of computer executable instructions. The computer executable instructions when executed by at least one processor performs a method. The at least one processor performs the method for network traffic analysis. The method includes a step of reception of a data set associated with an internet traffic at a network traffic analyzing system with a processor. The method includes another step of segmentation of the internet traffic to create a plurality of clusters based on a pre-selected percent variation. The method includes yet another step of determination of a relative activity of a set of clusters at a point in time. The method includes yet another step of determination of the relative activity of the set of clusters during successive time intervals. The data set associated with the internet traffic comprising data in the form of packets, wherein each packet is vectorized into a sequence of n-values. Each cluster of the plurality of clusters containing similar packets assigned with a same cluster ID While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying Figures, in which:

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1:
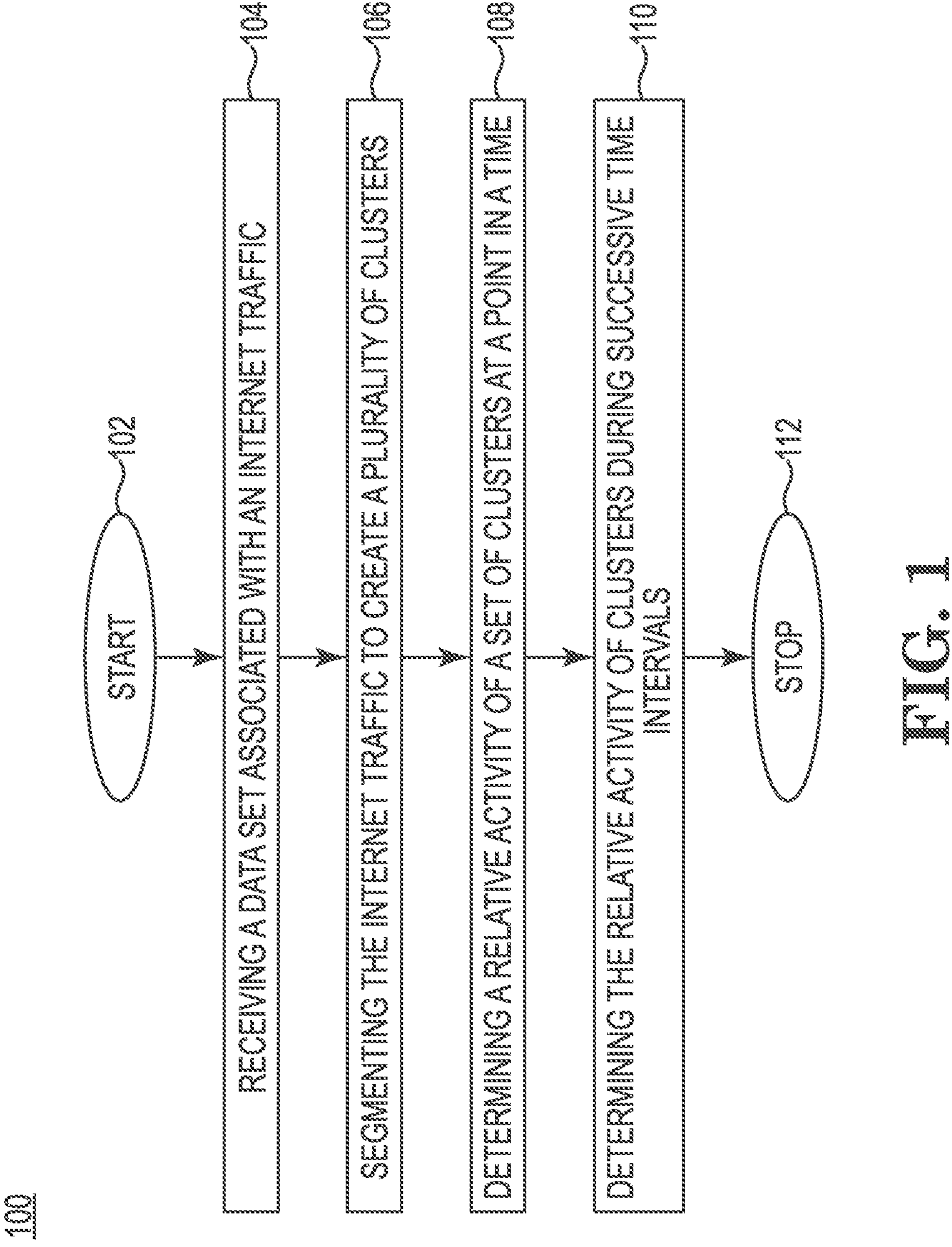
FIG. 1 illustrates a flow chart of a method for network traffic analysis using a network traffic analyzing system, in accordance with various embodiments of the present disclosure.

FIG. 1 illustrates a flow chart 100 of a method for network traffic analysis using a network traffic analyzing system, in accordance with various embodiments of the present disclosure. The network traffic analyzing system describes an environment suitable for an interactive reception and processing of a data set associated with an internet traffic. The network traffic analyzing system is configured to provide segmentation of the internet traffic. In addition, the network traffic analyzing system performs an unsupervised segmentation of the internet traffic. In general, internet traffic refers to flow of data within the entire network. In general, internet is the global system of interconnected computer networks that uses the Internet protocol suite (TCP/IP) to communicate between networks and devices. In an embodiment of the present disclosure, the internet traffic is handled by an internet protocol which has a standardized set of header fields that define such characteristics as length of a packet, source and destination IP addresses, plus additional fields required for that protocol. In an embodiment of the present disclosure, the internet protocol includes but may not be limited to UDP (user data protocol) and TCP (transmission control protocol).

In an example, UDP and TCP packets add a source and destination port to each packet and TCP packets additionally have flow control flags. In an embodiment of the present disclosure, the network traffic analyzing system vectorize each packet by selecting a standard set of features from a given protocol into a sequence of n values. In addition, the packet is viewed as a vector within an n-dimensional affine vector space.

The flow chart 100 initiates at step 102. Following step 102, at step 104 the method includes to receive a data set associated with the internet traffic. The data set associated with the internet traffic comprising data in the form of packets. At step 106, the method includes segmentation of the internet traffic to create the plurality of clusters based on a pre-selected percent variation. In addition, each cluster of the plurality of clusters containing similar packets assigned with a same cluster ID. At step 108, the method includes to determine a relative activity of a set of clusters at a point in time. At step 110, the method includes to determine the relative activity of clusters during successive time intervals. The flow chart terminates at step 112.

In an embodiment of the present disclosure, the data set of internet traffic vectorizes each packet and assigns the cluster ID in such a way that all packets assigned the same ID are within a known percent variation of each other (as a distance measurement) and packets with distinct IDs differ from each other by at least that percent variation. The network traffic analyzing system produces the unsupervised segmentation of packets grouping similar packets together and creating a dimensionally coherent reduction of the millions or billions of packets in the data set. In addition, packets assigned to the same cluster are not necessarily identical, but are very similar and viewed as distinct individuals belonging to the same packet species.

In an embodiment of the present disclosure, the network traffic analyzing system includes a tool. In addition, the tool includes a memory and CPU efficient segmentation capability. In an embodiment of the present disclosure, the segmentation of the internet traffic is achieved by using K means algorithm. In another embodiment of the present disclosure, the algorithm for segmenting the internet traffic may be any machine learning algorithm that segments semi-structured data based on similarity. In an embodiment of the present disclosure, the tool automatically determines the optimal number of clusters for whatever percent variation is desired using elbow technique. In an example, the tool may be approximately 1000 times faster than industry-standard techniques that produce the same segmentations on equivalent hardware and for the same data sets.

Figure 2:
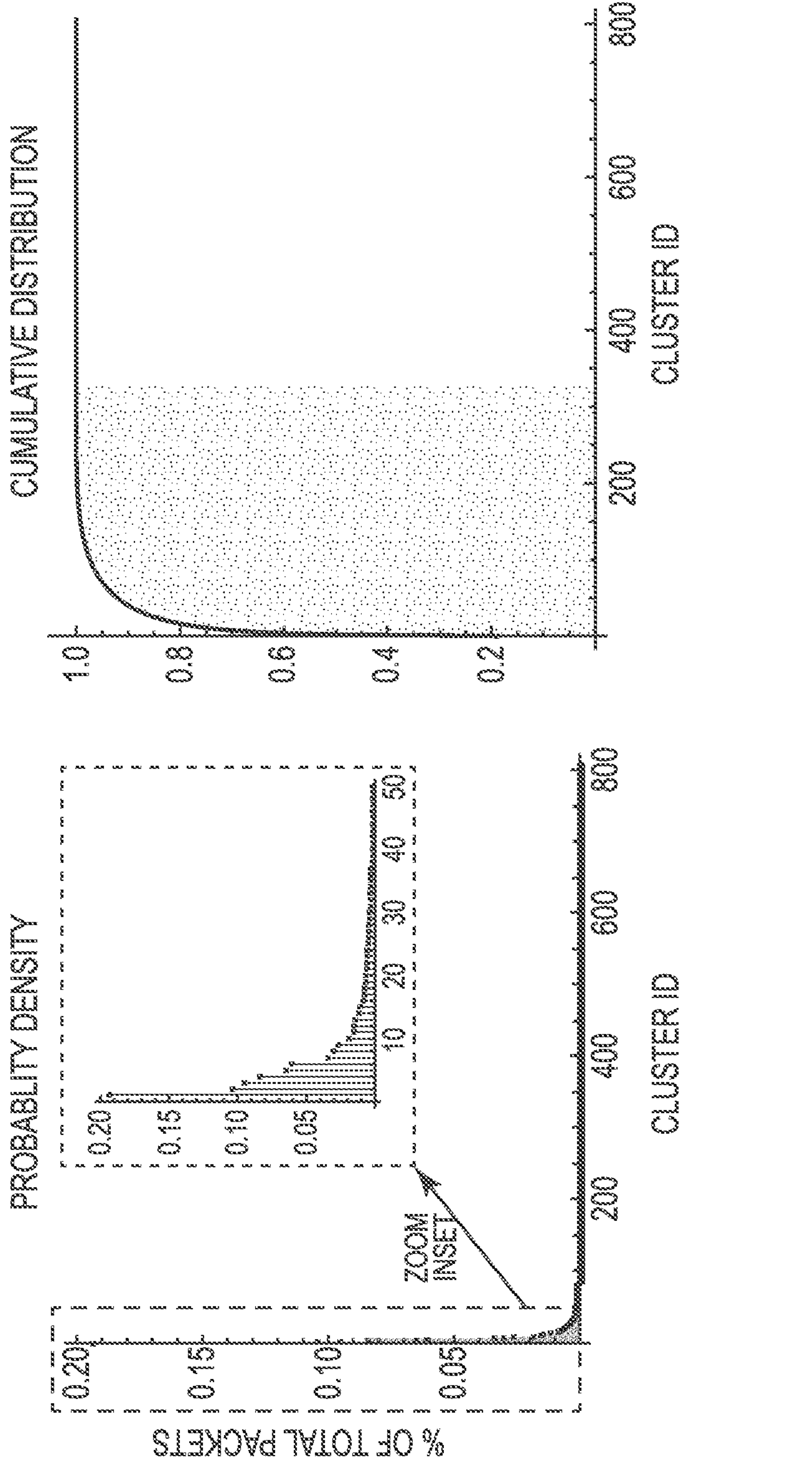
FIG. 2 shows an example for implementation of a tool that performed segmentation of TCP traffic.

FIG. 2 shows an example 200 for implementation of a tool that performed segmentation of TCP traffic, in accordance with various embodiments of the present disclosure. FIG. 2 shows an arrangement of the clusters in ascending order by indicating relatively rare TCP packet species being assigned to that particular cluster. In an example, some clusters are extremely large, representing packet species that are extremely common in TCP traffic, while other clusters are smaller indicating relatively rare TCP packet species. In an embodiment of the present disclosure, the network traffic analyzing system utilizes a cumulative distribution function and selects a collection of clusters that represents the dominant packet species found in TCP traffic. In an embodiment of the present disclosure, the network traffic analyzing system creates a cluster taxonomy accounting for 99.9% of all internet TCP traffic with a granularity of 3 percent variation from a data set of more than 100 million packets from diverse internet PCAP data sets.

In an example, if a cluster 0 is added to capture the remaining 0.1% of the internet traffic, then the canonical set of TCP clusters is a universal segmentation characterizing all TCP traffic occurring on the internet, whether between servers, laptops, phones, printers, routers, or the many emerging IoT-enabled devices. In another example, a similar segmentation process is applied to UDP traffic which, together with our TCP segmentation, captures more than 90% percent of all internet traffic across all protocols.

Figure 3:
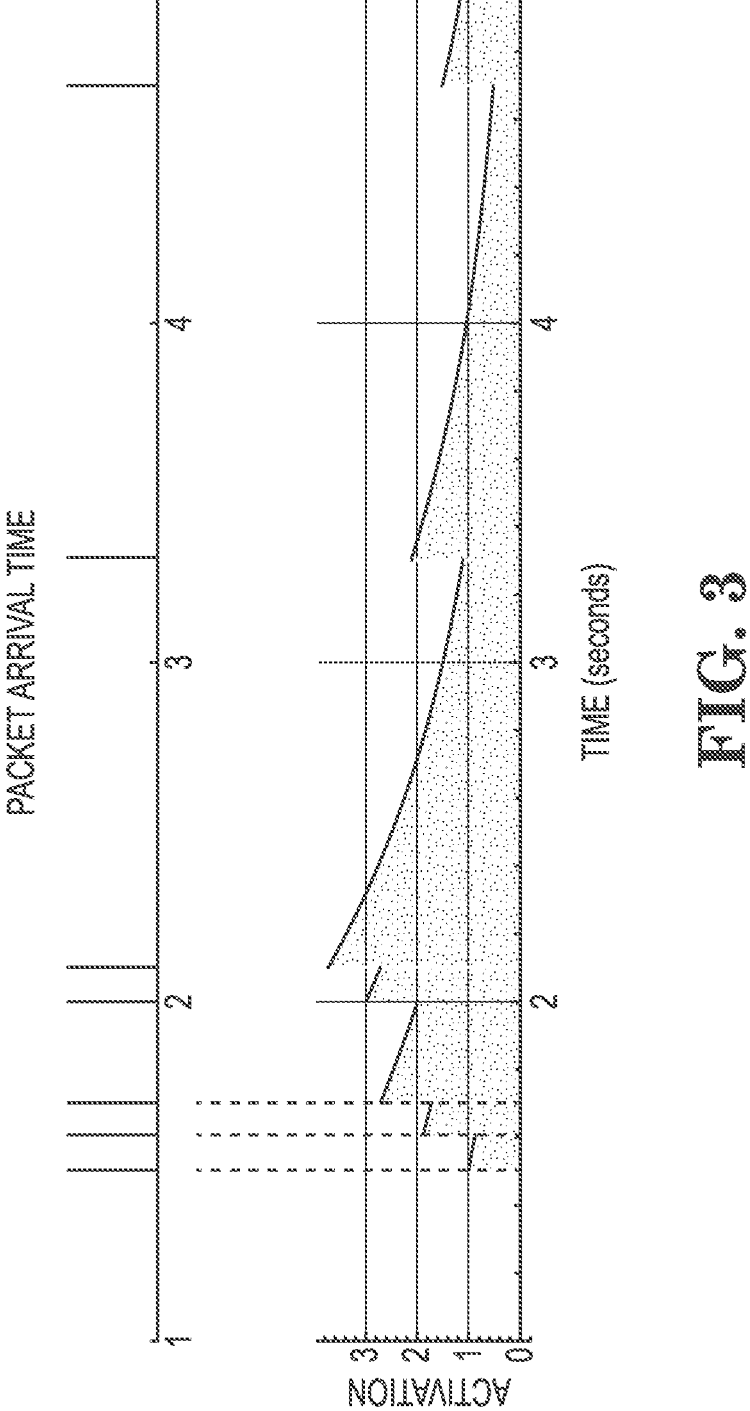
FIG. 3 shows a relative activity of a set of clusters for a network connected device, in accordance with various embodiments of the present disclosure.

FIG. 3 shows the relative activity of the set of clusters for a network connected device, in accordance with an embodiment of the present disclosure. In an embodiment of the present disclosure, the relative activity of the set of clusters is performed using a biological model of neuronal activation. In addition, the biological model of neuronal activation facilitates replacement of each packet event with an exponentially-decaying action potential event which leads to the formation of a continuous activation plot for that network connected device and for that specific cluster ID indicating the relative activity of that cluster ID at any time. In an example, a tightly packed burst of packets assigned that cluster ID will create a large activation value approximating the number of localized packets in the time series.

In an example, let us consider a network-connected device (say, X) capable of communicating via the TCP or UDP protocols. In addition, the network connected device sent or received packets assigned a specific ID within the canonical TCP+UDP segmentation space of cluster species. In addition, the specific cluster facilitates deriving a time series of packets assigned that cluster ID for that network connected device.

Figures 4A, 4B:
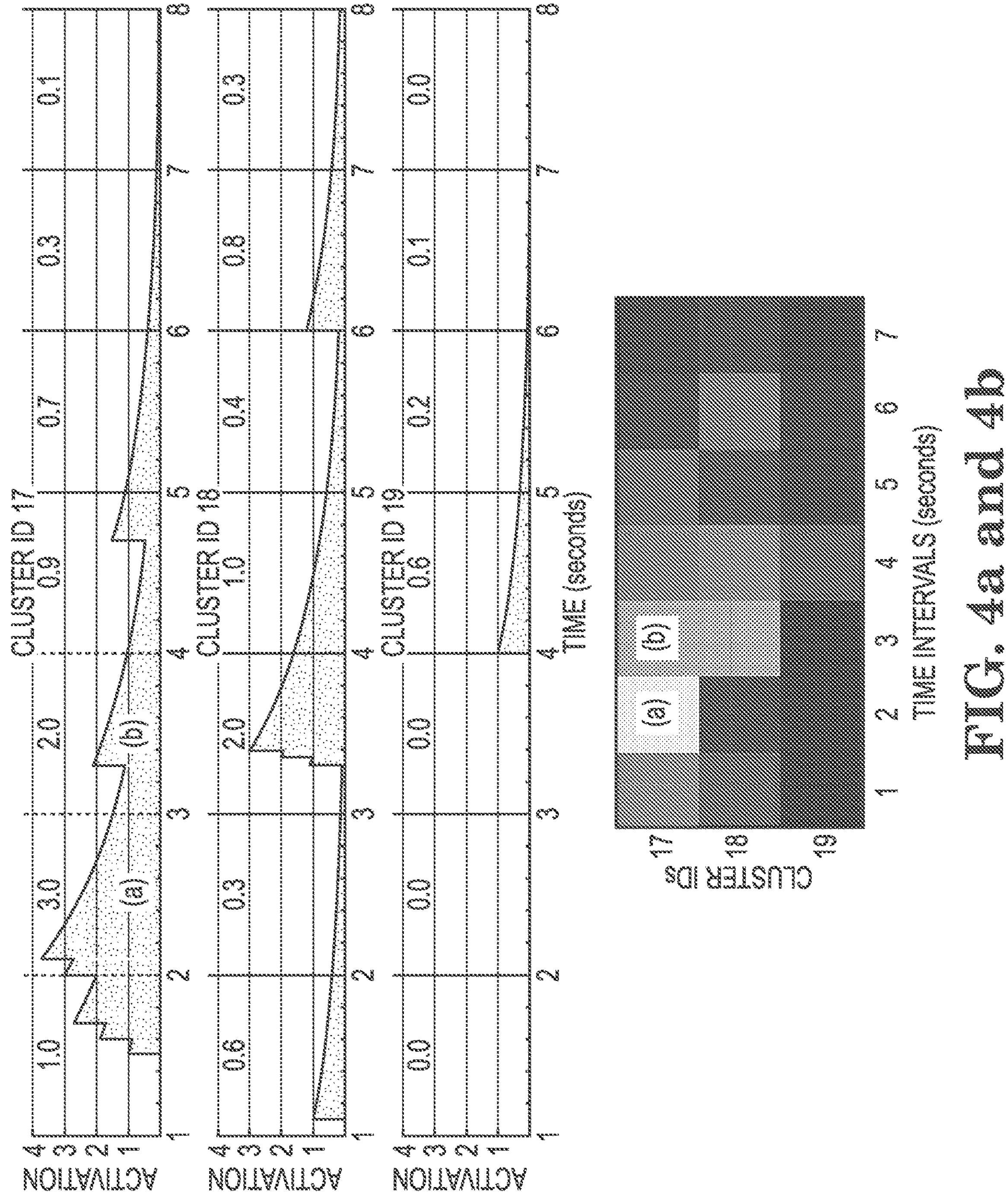
FIG. 4*a* shows activation plots for the set of clusters for one device on a subnet.
FIG. 4*b* shows a heat map derived from discrete activations along with heat map values.

FIG. **4*a* shows activation plots for the set of clusters for one device on a subnet, in accordance with various embodiments of the present disclosure. In addition, each activation plot shows packets assigned to the cluster for one device. Further, the activation plots are calculated in real-time across the set of clusters. In an embodiment of the present disclosure, the activation plots include discrete activations (as shown in FIG. 4*a*). In an example, let us consider a discrete time interval which is quantized over a network activity (say, 1 second or 1 minute), a discrete activation as the area under the activation plot is computed within each time interval. In an embodiment of the present disclosure, the discrete activation plots facilitate creation of a heat map (as shown in FIG. 4*b***) for a network-connected device showing relative activity of clusters during successive time intervals. In addition, the activation plots and associated heat maps create a characterization of device-level network traffic which is compared universally across all devices on all networks using the discrete activations to create a heat map for the device showing the relative activity of clusters during successive time intervals.

In an example, a device's network stack properties are reflected in the activation plots (as shown in FIG. 4*a*). In addition, the activation plots reveal network-based attacks for devices on a network, including denial-of-service attacks, port scans, and attacks that move laterally within the subnet such as internal probing. Further, the subnet receives the information gained by detecting attacks on one device and directly compared among network traffic analysts, including different organizations.

Figure 5:
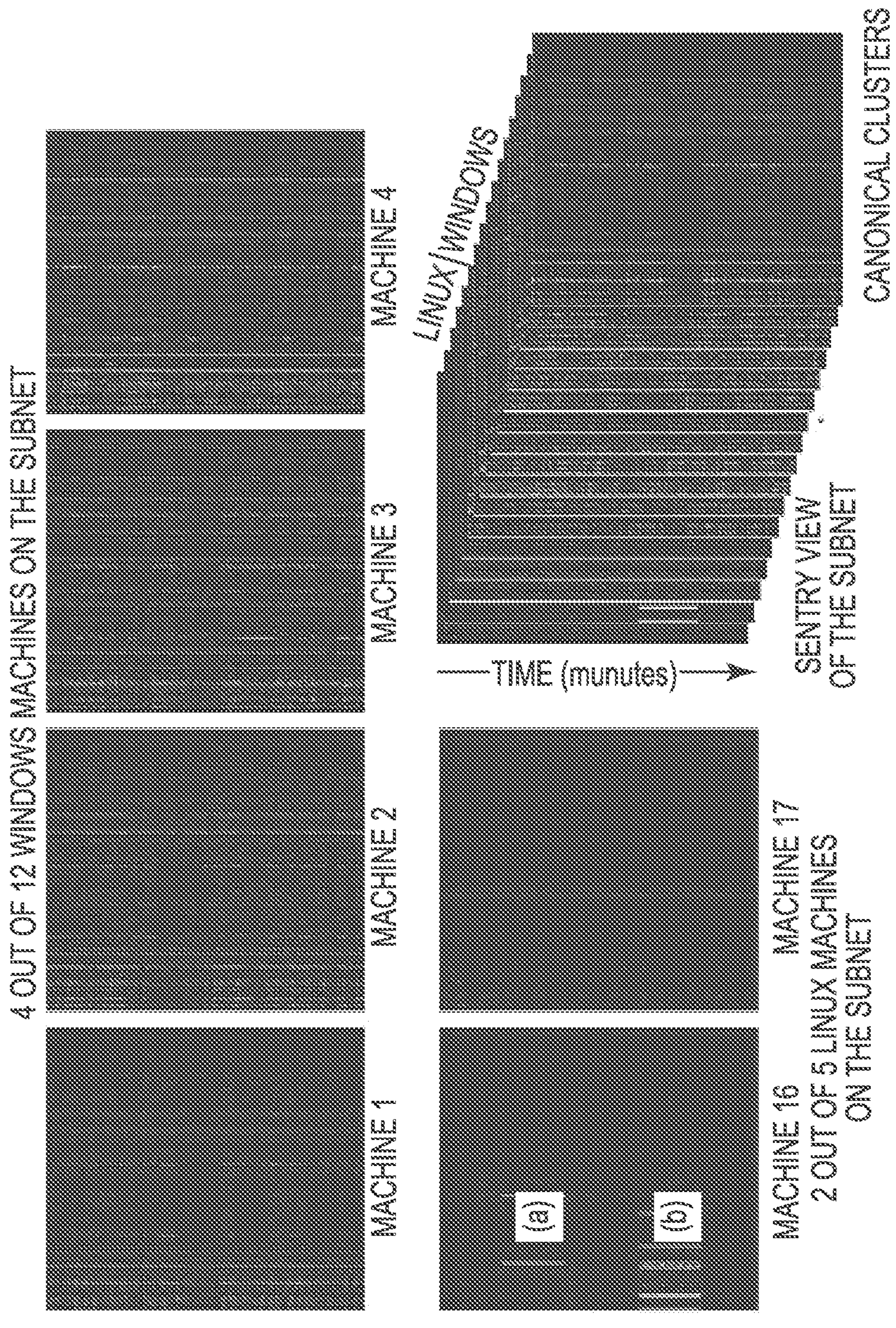
FIG. 5 shows the heat maps for 4 windows machines and 2 linux machines on the subnet.

In an embodiment of the present disclosure, the network traffic analyzing system provides a multi-dimensional view of all activities of network connected devices by correlating activation plots across both time and cluster IDs on the subnet. In an example, let us consider a plurality of devices on the subnet (say, by MAC or IP address). In addition, the network traffic analyzing system produces an activation heat map for each device of the plurality of devices by transposing the rows and columns, so that cluster IDs are arranged in ascending order in columns and successive time intervals run downward in each column. Further, the heat maps of the plurality of devices are stacked on the subnet provides a Sentry View of the subnet. Furthermore, the Sentry View has three independent dimensions (Cluster ID, Machine ID, and Time Interval) and one dependent dimension (discrete activation) provides a 4-dimensional view of the subnet which captures many aspects of network's behavior not visible using traditional network traffic analysis. FIG. 5 shows an example of the heat maps for 4 windows machines and 2 Linux machines on the subnet.

In an embodiment of the present disclosure, the Sentry View orients all network traffic around three independent axes that is time, machine (MAC address or IP address), and packet species (cluster ID). In addition, each 3-dimensional coordinate of the Sentry View has a dependent discrete activation value which create three distinct planar projections of the discrete activations by collapsing one of the three independent coordinates in order to derive specialized insights into the ongoing network behavior.

Figure 6:
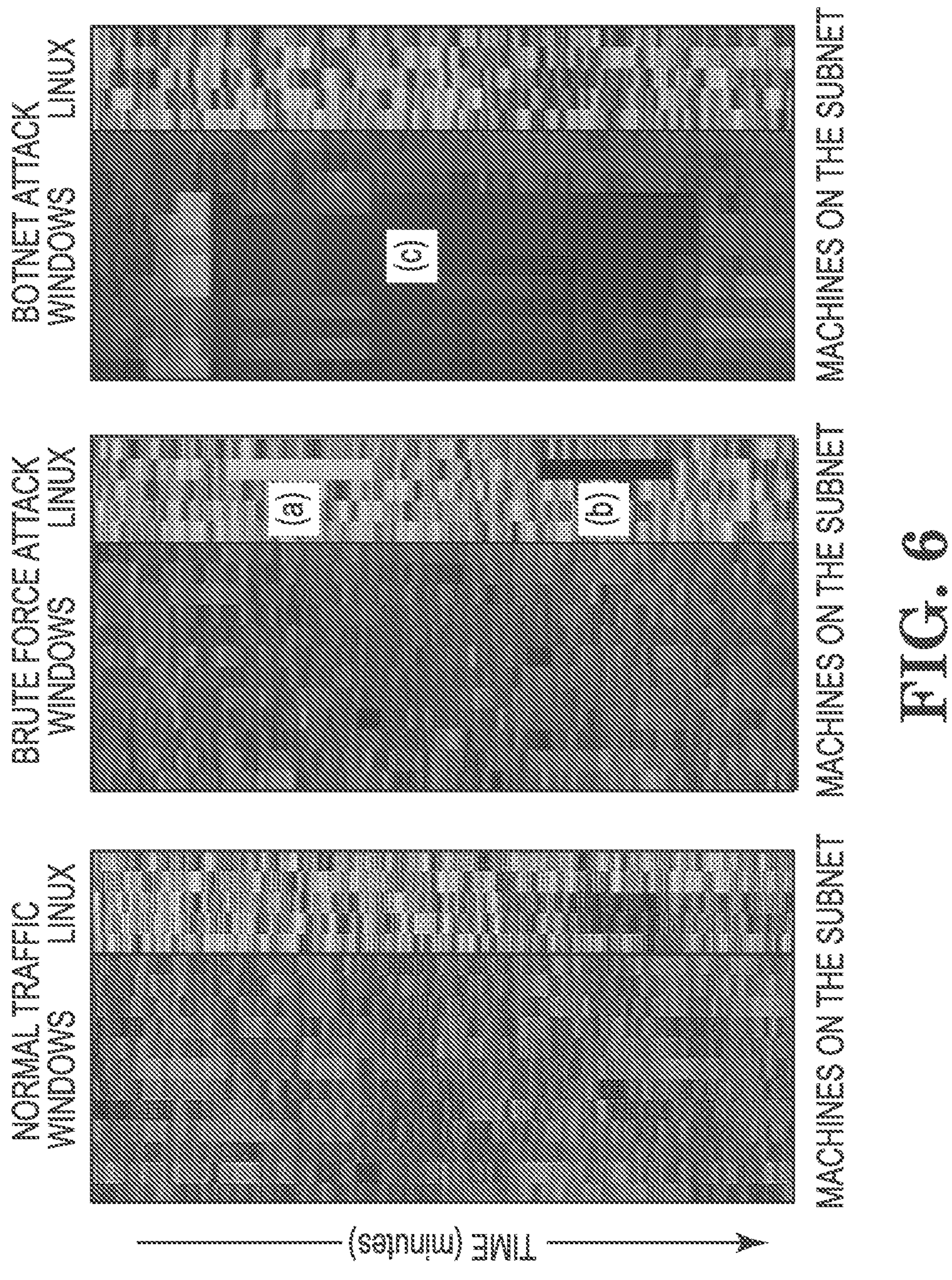
FIG. 6 shows projection 1 for machine vs time for normal traffic, brute force attack, botnet attack.

FIG. 6 shows projection 1 for machine vs time for normal traffic, brute force attack, botnet attack, in accordance with an embodiment of the present disclosure. In an example, let us consider a projection of the cluster ID dimension onto the machine vs time plane with leads to specific results. In addition, the specific results are suppressed about individual packet species in order to visualize the overall activation behavior of each machine on the subnet in time. Further, the cluster ID dimension is collapsed by aggregating the vector of discrete activation values along the cluster ID axis for each machine and time. Furthermore, the aggregation is done using an average. In an example, the projection 1 is performed using a Singular Value Decomposition (SVD) technique. In addition, the SVD technique allows one to determine dominant patterns of discrete activations along the Cluster ID axis for all of the heat maps in the Sentry View and then reorient each vector according to the dominant three components from the SVD technique. Further, the cluster ID vector for each 2D-coordinate (MAC Address, Time), is transformed at that coordinate into the dominant three component weights from the SVD and use that as the RGB color value of that coordinate.

FIG. 6 shows a projection of a differentiated network behavior of Windows machines versus Linux machines and that the Sentry View of a subnet reveals implicit properties of network devices arising from their network application usage. In an example, the Sentry View machine learning (ML) models are built using unsupervised machine learning, projections that reveal unexpected and previously unknown correlations between devices on the subnet. In addition, the correlations are useful in detecting misconfigured subnets, compromised computers, and malfunctioning devices, such as printers, IP cameras, and the like. FIG. 6 shows network intrusions by both known and unknown attack vectors that appear as anomalous patterns of network usage (shown in regions identified by (a), (b), and (c) in FIG. 6).

Figure 7:
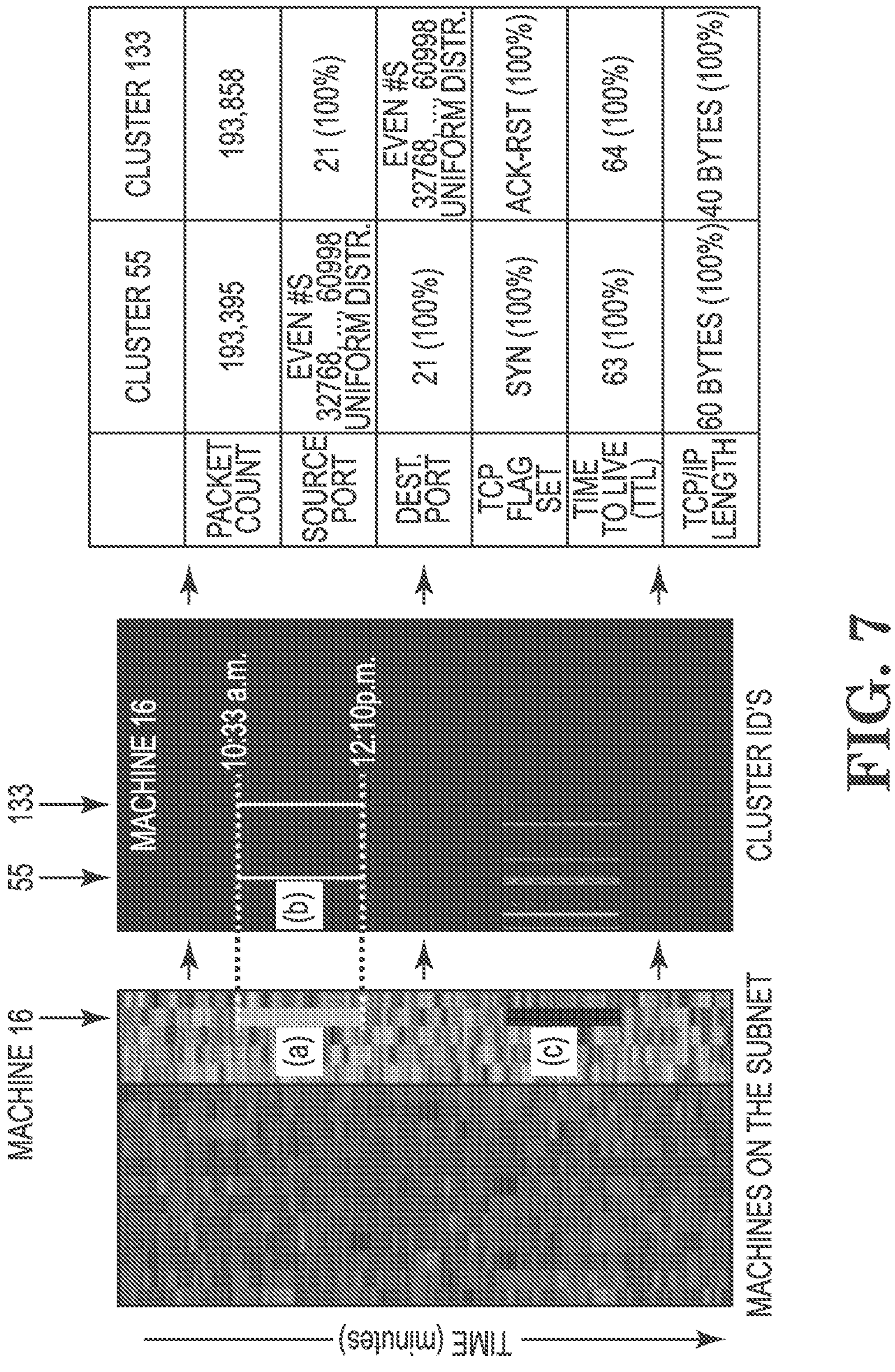
FIG. 7 shows a typical example of security forensics made possible by Sentry View.

FIG. 7 shows a typical example of security forensics made possible by Sentry View. The forensic capabilities of Sentry View for investigating the brute force attack are shown in FIG. 7. Let us consider two salient vertical "strips" of activation for one of the Linux machines (shown in FIG. 7, (a) and (c)) indicating two attacks on Machine 16, the first occurring at 10:30 a.m.-noon (a) and the second at 2:00-3:30 p.m. (c). In addition, focusing on Machine 16, the cluster-specific activity is investigated on that machine during those times by viewing Machine 16's activation plot. Further, focusing on the first incident (FIG. 7 (b)), two clusters 55 and 133 produced an extremely high volume of packets between 10:33 a.m. and 12:10 p.m. This sort of activation may indicate a port scan, brute force attack, or some other kind of high-volume, automated probing.

In an example, a cluster ID is assigned to every packet entering the network facilitates examining the features of all packets placed in two clusters 55 and 133 in order to gain further insight into the nature of an attack.

In an example, FIG. 7 (c) shows statistics for packet features in clusters 55 and 133 which leads to several key observations, shows that:

(a) Packets in cluster 55 includes destination port 21 which is a source port for packets in cluster 133. In addition, port 21 is the default port for File Transfer Protocol (FTP), the two clusters 55 and 133 are strongly activated by the packets from two sides of an attempted FTP connection.

(b) The FTP port of a victim computer is attacked. In addition, the source ports are uniformly distributed over the even-numbered ports on the range 32768-61000 which suggests brute force probing of the victim's FTP services, with the attacker spreading repeated connection requests from the upper half of its port range.

(c) The cluster 133 with source port 21 answering with packets having that same uniformly distributed range of even-numbered destination ports.

(d) The Packets in cluster 55 includes a SYN flag set, while cluster 133 contained ACK-RST packets with the minimum TCP/IP length of 40 bytes (indicating an empty payload). The reset (RST) response is a server's default reply to an unexpected connection request, for instance, a SYN packet arriving on a port which is closed.

(e) Inspecting timestamps attached to each packet in the attack showed that the packet stream alternated between clusters 55 and 133. This confirms that the two clusters represented two sides of a conversation repeatedly being opened and closed: the attacker sent a packet to the victim's FTP port to open a TCP connection, and the victim rejected this connection as its port 21 was closed.

The above example illustrates that the Sentry View network monitoring approach yields a real-time visualization of an attack that is iteratively investigated to obtain increasingly detailed information about the nature of the attack. In another example, machine 16 experienced a brute force attack on its FTP port on Day 2 from 10:33 a.m. to 12:10 p.m. In addition, the FTP port flooded by the attacker from numerous even-numbered source ports in the upper half of the port range, attempting connections which are rejected by the victim machine with matching replies to each failed connection. In yet another example, a similar forensic analysis is conducted on a SSH brute force attack later on day 2 (FIG. 7 (c)). In this case, 13 implicated clusters are mapped onto various components of 93,058 TCP connections comprising over 1 million failed SSH authentication attempts. In addition, the forensic analysis shows that the real-time, forensic insights are gained using the vectorized packets, the cluster IDs assigned, and statistical summaries of the packets in each cluster. Further, the forensic analysis shows that no stored logs or additional packet information are required. In an embodiment of the present disclosure, the Sentry View approach goes beyond merely identifying "when" and "where" anomalies have occurred within a subnet. In addition, the Sentry View approach reveals the specific features of the packets associated with anomalies and the network behavior of implicated machines. In an embodiment of the present disclosure, the Sentry View in principle also identifies unusual network behavior not associated with an attack: a misconfigured subnet, failing router, or malfunctioning network endpoint, such as a printer, IP security camera, or IoT sensor.

Figure 8:
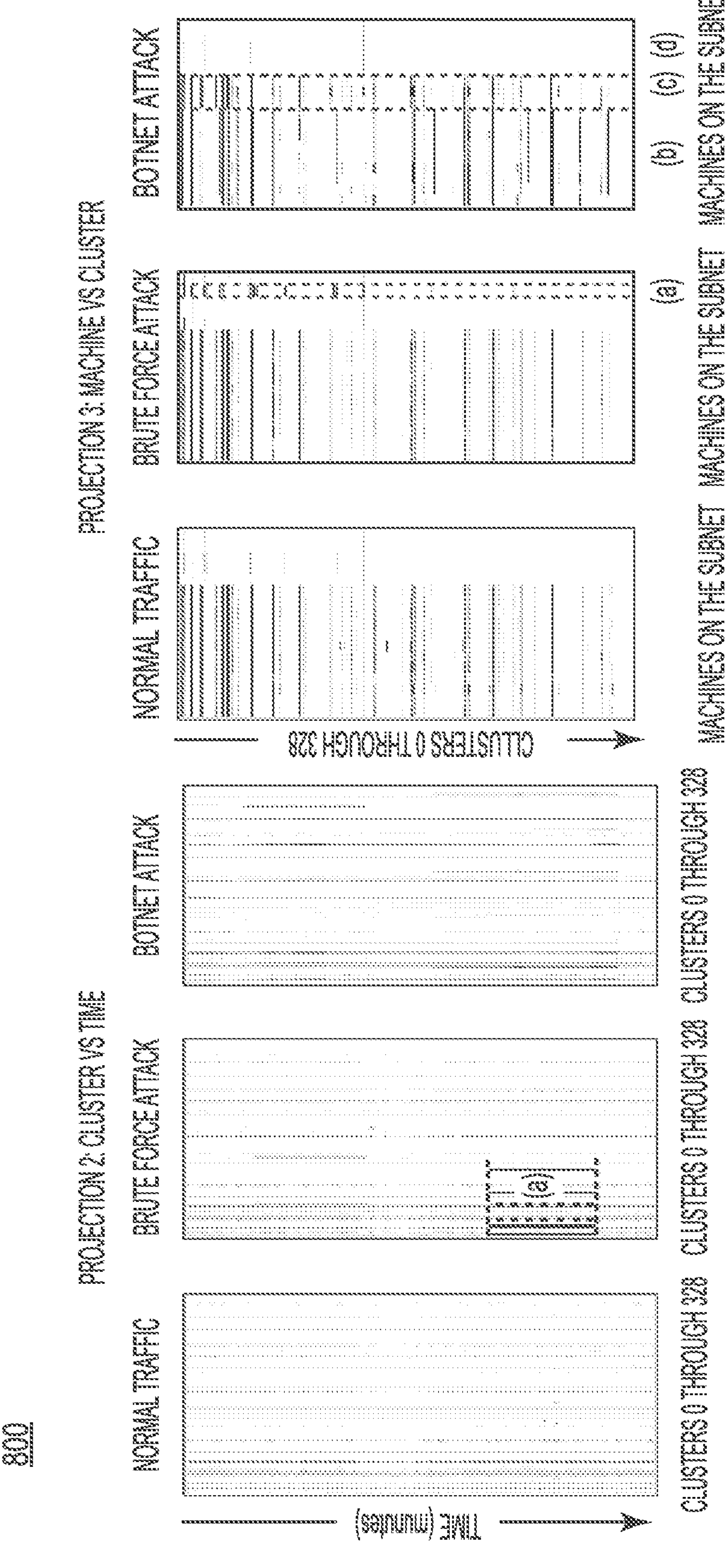
FIG. 8 shows projection 2 (cluster vs time) and projection 3 (machine vs cluster) for a canonical set of clusters.

FIG. 8 shows projection 2 (cluster vs time) and projection 3 (machine vs cluster) for a canonical set of clusters. In an example, projection 2 is obtained by projecting the vector of subnet MAC addresses onto the Cluster ID vs Time plane. In addition, projection 2 suppresses specifics about activation of particular machines, instead identifying clusters (packet species) that are especially active across many machines during the course of a day (FIG. 8). In an example, the projection 3 of the Sentry View is derived by projecting across time onto the Machine vs Cluster ID plane. In addition, the projection 3 suppresses the specific times of activation throughout the day and instead focuses on the aggregated relative activity of each cluster and machine. (FIG. 8). Further, for both projections, the log-average to collapse the third dimension of the Sentry View is utilized.

In an embodiment of the present disclosure, the Sentry View creates a universal taxonomy describing all network behavior, even across different organizations having diverse network topologies. In an example, all botnet attacks initiated using the same malware appears the same in Sentry View regardless of the networks or the point of origin. In an embodiment of the present disclosure, the Sentry View allows security operations centers to share knowledge about the "fingerprint" of various types of attacks and network behaviors. In addition, the Sentry Views of multiple subnets within an organization are combined and compared.

Figure 9:
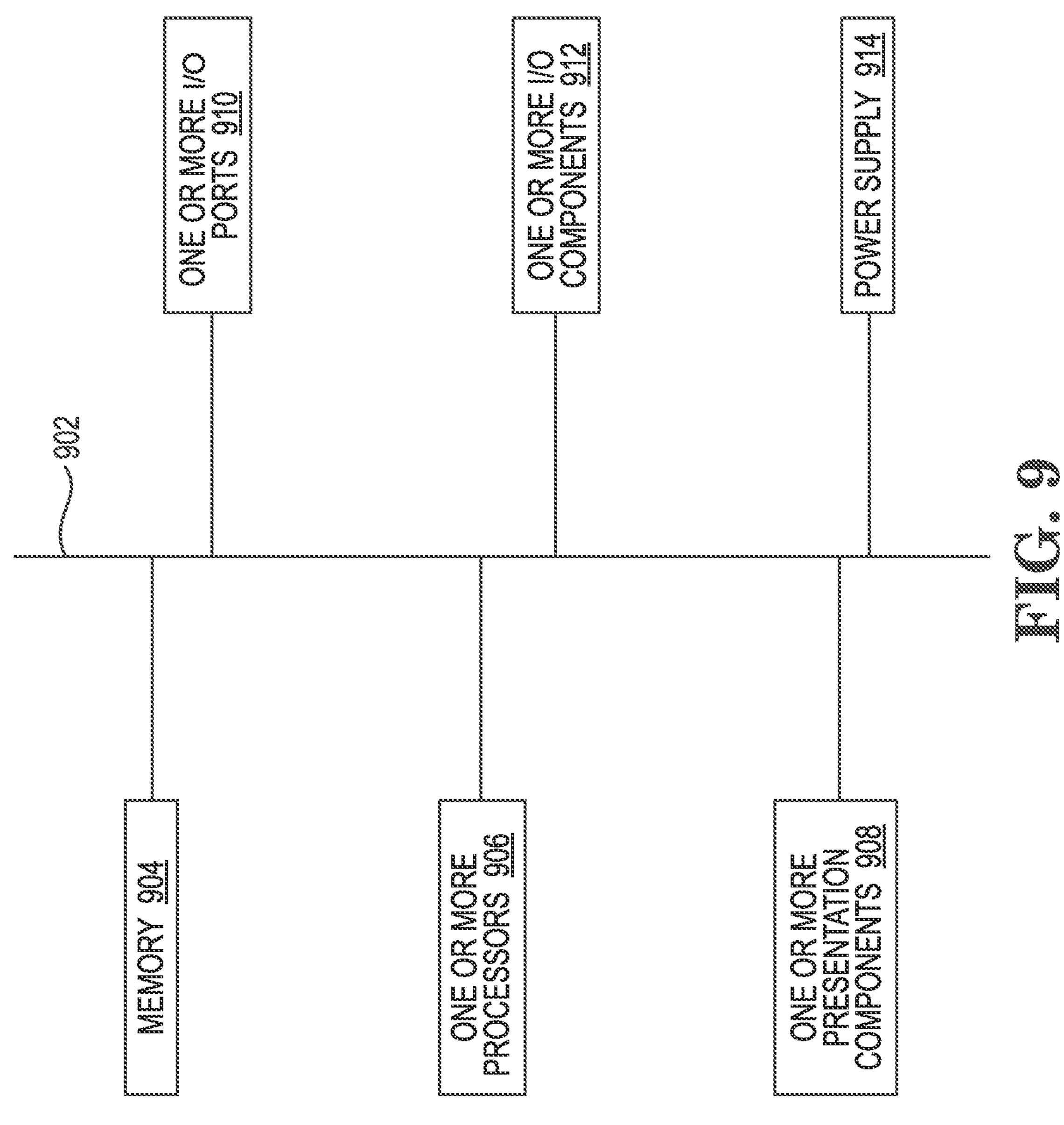
FIG. 9 illustrates a hardware framework of a network traffic analyzing system, in accordance with various embodiments of the present disclosure

FIG. 9 illustrates a hardware framework 900 of the network traffic analyzing system, in accordance with various embodiments of the present disclosure. The hardware framework 900 is required to run the network traffic analyzing system. The hardware framework 900 includes various components that work synchronously to enable processing of the network traffic analyzing system and allows storing of data in the network traffic analyzing system. The hardware framework 900 includes a bus 902 that directly or indirectly couples the following devices: memory 904, one or more processors 906, one or more presentation components 908, one or more input/output (I/O) ports 910, one or more input/output components 912, and an illustrative power supply 914. The bus 902 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 9 is merely illustrative of an exemplary hardware framework 900 that can be used in connection with one or more embodiments of the present invention. Distinction is not made between such categories as "workstation," "server," "laptop," "hand-held device," etc., as all are contemplated within the scope of FIG. 9 and reference to "hardware framework."

The hardware framework 900 typically includes a variety of computer-readable media. The computer-readable media can be any available media that includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, non-transitory computer-readable storage medium that stores program code and/or data for short periods of time such as register memory, processor cache and random access memory (RAM), or any other medium which can be used to store the desired information. The computer storage media includes, but is not limited to, non-transitory computer readable storage medium that stores program code and/or data for longer periods of time, such as secondary or persistent long term storage, like read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 904 includes computer-storage media in the form of volatile and/or nonvolatile memory. The memory 904 may be removable, non-removable, or a combination thereof. Exemplary hardware devices include solid-state memory, hard drives, optical-disc drives, etc. The hardware framework 900 includes the one or more processors 906 that read data from various entities such as memory 904 or I/O components 912. The one or more presentation components 908 present data indications to a user or other device. Exemplary presentation components include a display device, speaker, printing component, vibrating component, etc.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms mentioned.

For the purposes of this disclosure, any system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a minicomputer, mainframe computer, personal computer (e.g., desktop or laptop), tablet computer, embedded computer, mobile device (e.g., personal digital assistant (PDA) or smartphone) or other hand-held computer device, server (e.g., blade server or rack server), a network storage device, or any other suitable device or combination of devices and may vary in size, shape, performance, functionality, and price. A system may include volatile memory (e.g. random access memory (RAM)), one or more processing resources such as a central processing unit (CPU) or hardware or software control logoc, ROM, and/or other types of nonvolatile memory (e.g., EPROM, EEPROM, etc.). A basic input/output system (BIOS) can be stored in the non-volatile memory (e.g., ROM), and may include basic routines facilitating communication of data and signals between components within the system. The volatile memory may additionally include a high-speed RAM, such as static RAM for caching data.

Additional components of a system may include one or more disk drives or one or more mass storage devices, one or more network ports for communicating with external devices as well as various input and output (I/O) devices, such as digital and analog general purpose I/O, a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, a storage subsystem, or any combination of storage devices. A storage interface may be provided for interfacing with mass storage devices, for example, a storage subsystem. The storage interface may include any suitable innerface technology, such as EIDE, ATA, SATA, and IEEE 1394. A system may include what is referred to as a user interface for interacting with the system, which may generally include a display, mouse or other cursor control device, keyboard, button, touchpad, touch screen, stylus, remote control (such as an infrared remote control), microphone, camera, video recorder, gesture systems (e.g., eye movement, head movement, etc.), speaker, LED, light, joystick, game pad, switch, buzzer, bell, and/or other user input-output device for communicating with one or more users or for entering information into the system. These and other devices for interacting with the system may be connected to the system through I/O device interface(s) vie a system bus, but can be connected by other interfaces such as a parallel port, IEEE 1394 serial port, a game port, a USB port, an IR interface, etc. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices.

A system may also include one or more buses operable to transmit communications between the various hardware components. A system bus may be any of several types of bus structure that can further interconnect, for example, to a memory bus (with or without a memory controller) and/or a peripheral bus (e.g., PCI, PCIe, AGP, LPC, I2C, SPI, USB, etc.) using any of a variety of commercially available bus architectures.

One or more programs or applications, such as a web browser and/or other executable applications, may be stored in one or more of the system data storage devices. Generally, programs may include routines, methods, data structures, or other software components, etc., that perform particular tasks or implement particular abstract data types. Programs or applications may be loaded in part or in whole into a main memory or processor during execution by the processor. One or more processors may execute applications or programs to run systems or methods of the present disclosure, or portions thereof, stored as an executable program code in the memory or received from the Internet or other network. Any commercial or freeware web browser or other application capable of retrieving content from a network and displaying pages or screens may be used. In some embodiments, a customized application may be used to access, display, and update information. A user may interact with the system, programs, and data stored thereon or accessible thereto using one or more of the input and output devices described above.

A system of the present disclosure can operate in a networked environment using logical connections via a wired and/or wireless communications subsystem to one or more networks and/or other computers. Other computers can include, but are not limited to, workstations, servers, routers, personal computers, microprocessor-based entertainment appliances, peer devices, or other common network noces, and may generally include many or all of the elements described above. Logical connections may include wired and/or wireless connectivity to a local area network (LAN), a wide area network (WAN), a hotspot, a global communications network, such as the Internet, and so on. The system may be operable to communicate with wired and/or wireless devices or other processing entitles using, for example, radio technologies, such as the IEEE 802.xx family of standards, and includes at least Wi-Fi (wireless fidelity), WiMax, and Bluetooth wireless technologies. Communications can be made via a predefined structure as with a conventional network or via an ad hoc communication between at least two devices.

Hardware and software components of the present disclosure, as discussed herein, may be integral portions of a single computer, server, controller, or message sign, or may be connected parts of a computer network. The hardware and software components may be located within a single location or, in other embodiments, portions of the hardware and software components may be divided among a plurality of locations and connected directly or through a global computer information network, such as the Internet. Accordingly, aspects of the various embodiments of the present disclosure can be practiced in distributed computing environments, where certain tasks are performed by remote processing devices that are linked through a communications network. In such a distributed computing environment, program modules may be located in local and/or remote storage and/or memory systems.

As will be appreciated by one of skill in the art, the various embodiments of the present disclosure may be embodied as a method (including, for example, a computer-implemented process, a business process, and/or other process), apparatus (including, for example, a system, machine, device, computer program product, and/or the linke), or a combination of the foregoing. Accordingly, the embodiments of the present disclosure may take the form of an entirely hardware embodiment, an entirely software embodiment (including firmware, middleware, microcode, hardware description languages, etc.), or an embodiment combining software and hardware aspects.

Furthermore, embodiments of the present disclosure may take the form of a computer program product on a computer-readable medium or computer-readable storage medium, having computer-executable program code embodied in the medium, that define process or methods described herein. A process or processors may perform the necessary tasks defined by the computer-executable program code. Computer-executable program code for carrying out operations of embodiments of the present disclosure may be written in an object oriented, scripted, or unscripted programming language such as Java, Perl, PHP, Visual Basic, Smalltalk, C++, or the link. However, the computer code for carrying out operations of embodiments of the present disclosure may also be written in conventional procedural programming languages, such as the C programming language or similar programing languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example, but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM). an erasable programmable read-only memory (EPROM or Flash memory), a compact disc read-only memory (CD-ROM), or other optical or magnetic storage devices. Computer-readable media includes but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a process of a general purpose computer, special purpose computer, or other programmable data processing apparatus to produce a particular machine such that the code portions, which execute via the process of the computer or other programmable data processing apparatus, create mechanisms for implementing the functions/acts specified in the flowchart and/or block diagram block or blocks. Alternatively, computer program implemented steps or acts may be combined with operator or human implemented steps in order to carry out an embodiment of the disclosure.

Additionally, although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged in some embodiments. Similarly, a method or process illustrated in a flowchart or block diagram could have additional steps or operations included therein or fewer steps or operations than those shown. Moreover, a method step may correspond to a method, a function, a procedure, a subroutine, a subprogram, etc.

As used herein, the terms "substantially" or "generally" refer to the complete or near complete extent or degree of an action, characteristic, property, state, structure, item, or result, for example, an object that is "substantially" or "generally" enclosed would mean that the object is either completely enclosed or nearly completely enclosed. The exact allowable degree of deviation from absolute completeness may in some cases depend on the specific context. However, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications are suited to the particular use contemplated. All such modifications and variations are within the scope of the present disclosure as determined by the appended claims when interpreted in accordance with the breadth to which they are fairly, legally, and equitably entitled.

In the foregoing description various embodiments of the invention have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A computer-implemented method for network traffic analysis, the computer-implemented method comprising:
receiving, at a network traffic analyzing system with a processor, a data set associated with an internet traffic, wherein the data set associated with the internet traffic comprising data in the form of packets;
segmenting, at the network traffic analyzing system with the processor, the packets to create a plurality of clusters based on a pre-selected percent variation, wherein each cluster of the plurality of clusters containing similar packets assigned with a same cluster ID, and wherein the packets assigned with the same cluster ID are within the pre-selected percent variation;
determining, at the network traffic analyzing system with the processor, a relative activity of a set of clusters at a point in time; and
determining, at the network traffic analyzing system with the processor, the relative activity of the set of clusters during successive time intervals, wherein the relative activity of the set of clusters is determined using a neuronal model of internet traffic activity, wherein the neuronal model facilitates replacement of each packet event with an exponentially decaying action potential event forming a continuous activation plot for a specific network-connected device allotted with specific cluster ID.

2. The computer-implemented method as recited in claim 1, wherein the step of segmenting the internet traffic is unsupervised.

3. The computer-implemented method as recited in claim 2, wherein the tool determines the optimal number of clusters based on the desired percent variation using an elbow technique.

4. The computer-implemented method as recited in claim 1, wherein the segmentation of the internet traffic is performed using an n-space segmentation algorithm, such as the K-means algorithm.

5. The computer-implemented method as recited in claim 1, wherein the network traffic analyzing system provides continuous activation plots and discrete activation plots calculated in real-time across all the set of clusters.

6. The computer-implemented method as recited in claim 5, wherein the discrete activation plots facilitate creation of a heat map for a network-connected device showing relative activity of clusters during successive time intervals, wherein the activation plots and associated heat maps creates a characterization of device-level network traffic which is compared universally across all devices on all networks.

7. The computer-implemented method as recited in claim 1, wherein the network traffic analyzing system provides a multi-dimensional view of all activities of network connected devices by correlating activation plots across both time and cluster ID on a subnet.

8. The computer-implemented method as recited in claim 1, where in the step of segmenting captures more than 90% of the network traffic.

9. The computer-implemented method as recited in claim 1, wherein the network traffic analyzing system projects a Sentry View of network traffic around three independent axis, such as time, machine (MAC address or IP address), and packet species (cluster ID).

10. The computer-implemented method as recited in claim 9, wherein the Sentry View creates a universal taxonomy describing all network behavior, even across different organizations having diverse network topologies.

11. The computer-implemented method as recited in claim 1, wherein prior to the segmenting the packets, further comprising vectorizing the packets into a sequence of n-values.

12. A computer system comprising:
one or more processors; and
a memory coupled to the one or more processors, the memory for storing instructions which, when executed by the one or more processors, cause the one or more processors to perform a method for network traffic analysis, the method comprising:
receiving, at a network traffic analyzing system with a processor, a data set associated with an internet traffic, wherein the data set associated with the internet traffic comprising data in the form of packets;
segmenting, at the network traffic analyzing system with the processor, the packets to create a plurality of clusters based on a pre-selected percent variation, wherein each cluster of the plurality of clusters containing similar packets assigned with a same cluster ID, and wherein the packets assigned with the same cluster ID are within the pre-selected percent variation;
determining, at the network traffic analyzing system with the processor, a relative activity of a set of clusters at a point in time; and
determining, at the network traffic analyzing system with the processor, the relative activity of clusters during successive time intervals, wherein the relative activity of the set of clusters is determined using a neuronal model of internet traffic activity, wherein the neuronal model facilitates replacement of each packet event with an exponentially decaying action potential event forming a continuous activation plot for a specific network-connected device allotted with specific cluster ID.

13. The computer system as recited in claim 12, wherein the network traffic analyzing system comprising a tool, wherein the tool comprising a memory and a CPU efficient segmentation capability.

14. The computer system as recited in claim 12, wherein the segmentation of the internet traffic is performed using a segmentation algorithm, such as the K-means algorithm.

15. The computer system as recited in claim 12, where in the segmentation captures more than 90% of the internet traffic.

16. The computer system as recited in claim 15, wherein the network traffic analyzing system provides continuous activation plots and discrete activation plots calculated in real-time across all the set of clusters.

17. The computer system as recited in claim 12, wherein prior to the segmenting the packets, further comprising vectorizing the packets into a sequence of n-values.

18. A non-transitory computer-readable storage medium encoding computer executable instructions that, when executed by at least one processor, performs a method for network traffic analysis, the method comprising:
receiving, at a network traffic analyzing system with a processor, a data set associated with an internet traffic, wherein the data set associated with the internet traffic comprising data in the form of packets;
segmenting, at the network traffic analyzing system with the processor, the packets to create a plurality of clusters based on a pre-selected percent variation, wherein each cluster of the plurality of clusters containing similar packets assigned with a same cluster ID, and wherein the packets assigned with the same cluster ID are within the pre-selected percent variation;

determining, at the network traffic analyzing system with the processor, a relative activity of a set of clusters at a point in time; and determining, at the network traffic analyzing system with the processor, the relative activity of clusters during successive time intervals, wherein the relative activity of the set of clusters is determined using a neuronal model of internet traffic activity, wherein the neuronal model facilitates replacement of each packet event with an exponentially decaying action potential event forming a continuous activation plot for a specific network-connected device allotted with specific cluster ID.

19. The non-transitory computer-readable storage medium as recited in claim 18, where in the network traffic analyzing system as part of the segmentation step captures more than 90% of the internet traffic.

20. The non-transitory computer-readable storage medium as recited in claim 19, wherein the network traffic analyzing system provides continuous activation plots and discrete activation plots calculated in real-time across all the set of clusters.

21. The non-transitory computer-readable storage medium as recited in claim 20, wherein the discrete activation plots facilitate creation of a heat map for a network-connected device showing relative activity of clusters during successive time intervals, wherein the activation plots and associated heat maps creates a characterization of device-level network traffic which is compared universally across all devices on all networks.

22. The non-transitory computer-readable storage medium as recited in claim 18, wherein the network traffic analyzing system projects Sentry View of network traffic around three independent axis, such as time, machine (MAC address or IP address), and packet species (cluster ID).

23. The non-transitory computer-readable storage medium as recited in claim 22, wherein the Sentry View creates a universal taxonomy describing all network behavior, even across different organizations having diverse network topologies.

24. The non-transitory computer-readable storage medium recited in claim 18, wherein prior to the segmenting the packets, further comprising vectorizing the packets into a sequence of n-values.

* * * * *